April 18, 1967     C. P. MIES, JR., ET AL     3,314,177
ORDER CLIP AND ROTATIVE MOUNTING THEREFOR
Filed March 11, 1965
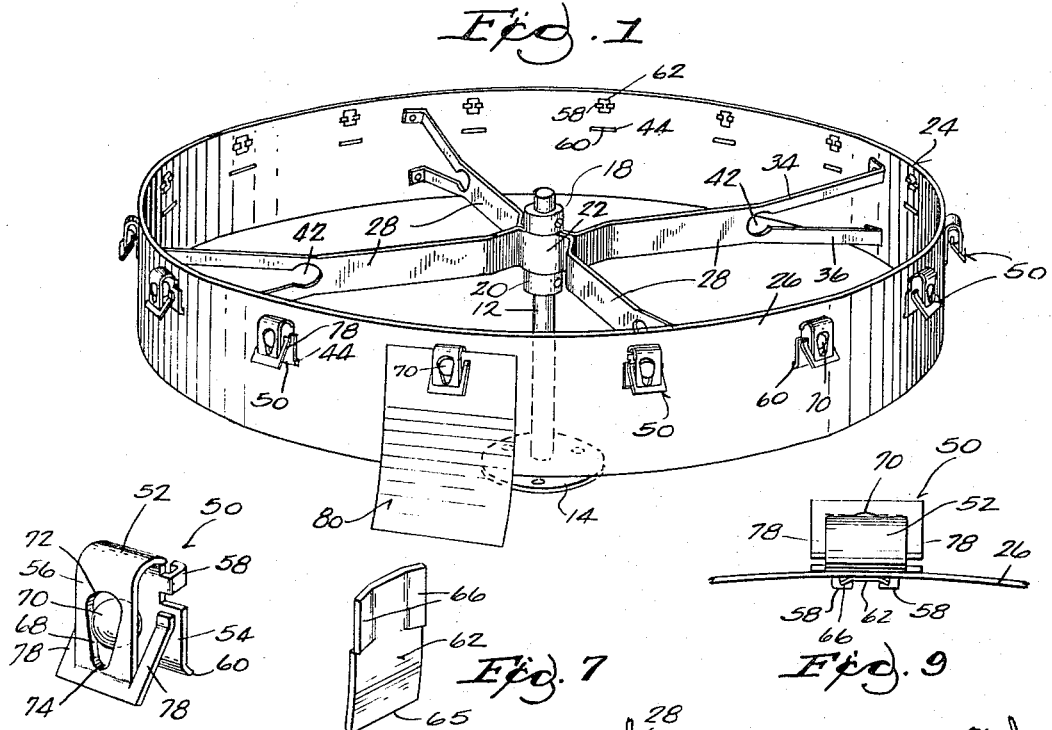
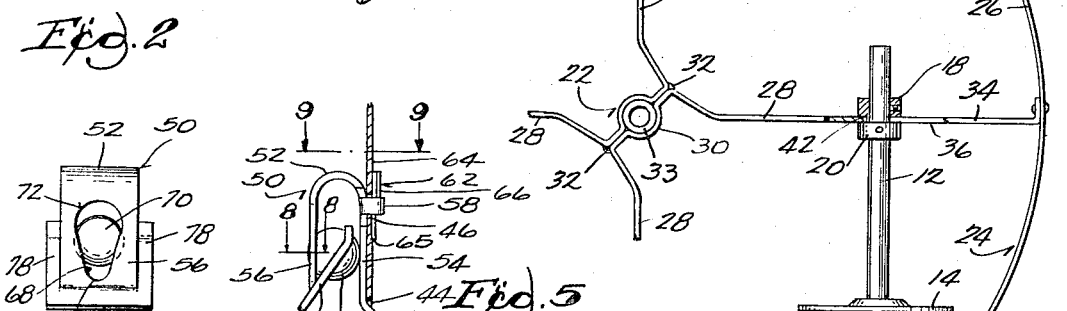
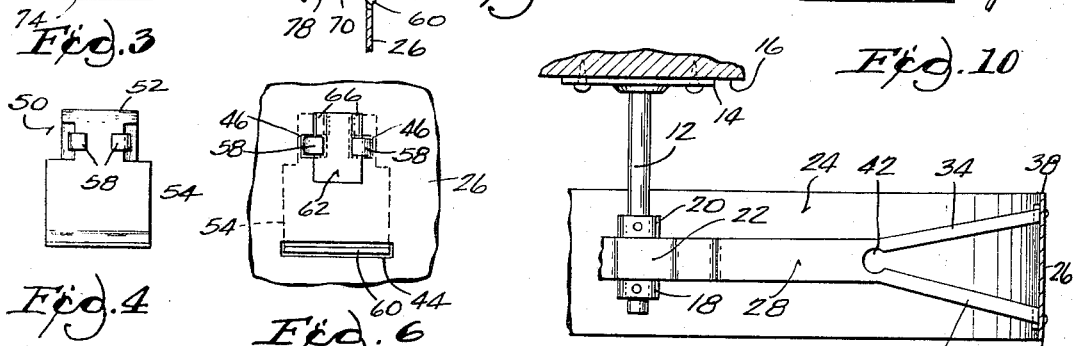
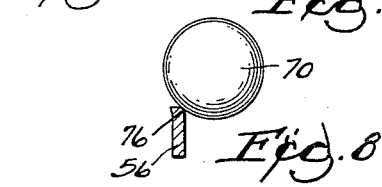
INVENTORS
CARL P. MIES, JR.
DIETER F. WEGNER
BY Wheeler, Wheeler & Wheeler
ATTORNEYS United States Patent Office 3,314,177
Patented Apr. 18, 1967

3,314,177
ORDER CLIP AND ROTATIVE MOUNTING
THEREFOR
Carl P. Mies, Jr., Shelbyville, Ky., and Dieter F. Wegner, Sussex, Wis., assignors to Wegner and Krueger Manufacturing, Inc., Menomonee Falls, Wis., a corporation of Wisconsin
Filed Mar. 11, 1965, Ser. No. 438,974
10 Claims. (Cl. 40—124)

This invention relates to an order clip and rotative mounting therefor.

The clip is useful per se. As herein disclosed, the complete assembly is specifically designed to support restaurant order slips or like work piece. The clip may also be used, for example, to support parts lists, or instruction sheets in a factory.

A rotor having an annular rim about which the work-retaining clips are disposed has a hub which provides a bearing on a post, the mounting plate of which may be either above or below the rotor. The rotor spokes have integral portions providing segments of the hub, and spoke portions which are divergent from such segments and in rigid connection with upper and lower parts of the rim. Each spoke is bifurcated and at least one has an aperture performing the dual function of preventing splitting of the spoke and also providing a mounting in which the post is fixed during shipment.

Each clip has hooked arms extending through apertures provided in the rim of the rotor. However, since the clip is made of spring stock, instead of upsetting the material of the clip to anchor it to the rotor, it is preferred to use a retaining key detachably engaged with these hooked arms at the inside of the rotor. The key is also made of stainless spring stock, and it holds the clip securely but detachably to the rotor.

The clip has front and rear walls between which is confined a detent ball which has wedging action between the downwardly converging margins of an oval opening whereby to retain tickets or slips inserted into the clip. The ball is yieldable upwardly into the upwardly widening portion of the said opening. Integral portions of the clip constitute guides extending upwardly and rearwardly from the free end of the front wall to guide inserted paper articles to positions behind the ball where they will wedge against any attempt to withdraw them downwardly. However, the arrangement is such that if the inserted article is withdrawn laterally, it meets virtually no resistance whatever.

In forming the clip, the tapered aperture in which the ball wedges is blanked from the inside out so that any resulting burr is formed outwardly, leaving a smoothly rounded ball race at the margin of the opening.

In the drawings:

FIG. 1 is a view in perspective of a complete restaurant order rack embodying the invention, a single sheet being shown in place thereon.

FIG. 2 is a detail view in perspective showing the clip on an enlarged scale.

FIG. 3 is a plane view of the clip shown in FIG. 2.

FIG. 4 is a view of the clip in rear elevation.

FIG. 5 is a view of the clip in side elevation, portions of the rotor portion of the rack being shown in section.

FIG. 6 is a rear elevational view of the portion of the clip visible from the interior of the rotor, portions of the rotor rim being fragmentarily illustrated.

FIG. 7 is a detail view in perspective of the locking key employed to retain the clip on the rotor.

FIG. 8 is a detail view on an enlarged scale taken in section on the plane indicated at 8—8 in FIG. 5.

FIG. 9 is a fragmentary detail view taken in section on the line 9—9 of FIG. 3.

FIG. 10 is a fragmentary plan view of the rack showing the supporting post mounted for shipment, the rotor being fragmentarily illustrated and parts being broken away.

FIG. 11 is a fragmentary view in section showing the post positioned with its mounting plate above the rotor rather than beneath the rotor.

The post 12 has a mounting plate 14 which may rest on a table or shelf as in FIG. 1 or may be screwed to an overhead surface 16 as in FIG. 11. Positioned on the post by means of set screws or the like are collars 18 and 20 between which the hub or bearing portion 22 of the rotor 24 is positioned for rotation.

The rotor 24 comprises a rim 26 supported by spokes 28 from the hub or bearing portion 22. As shown, each pair of spokes 28 is integrally joined by a connecting portion 30 which is curvilinear, comprising one segment of the hub 22. There being two pairs of spokes in the preferred assembly illustrated, there are two 180° bearing segments 30, these being connected as by welding at 32. Preferably used between the segments 30 is the bushing 33 which rotates on the mounting post 12.

Each spoke is bifurcated to provide separate legs 34 and 36 respectively connected to the rim 26 of the rotor near its upper and lower margins 38 and 40. Adjacent the junction of the legs 34 and 36, each spoke has an aperture 42 which is large enough to receive the post 12 so that the post may be retained therein by engaging the collars 18 and 20 with the spoke as shown in FIG. 10. This disposes the post and its base in the plane of the rotor so that the entire assembly can be shipped in a flat carton having thickness no greater than the vertical dimension of the rotor rim 26.

The rim 26 is punched with sets of apertures for the mounting of the work supporting clips 50, which are separately illustrated in FIGS. 2 to 4 and shown in assembly in FIGS. 1, 5 and 6. Each set of apertures includes a generally horizontal slot 44 and a pair of laterally spaced rectangular slots 46 which best appear in dotted lines in FIG. 6.

*The clip*

The clip 50 is made from a single strip of spring sheet metal having a top portion 52 preferably curved on a broad radius to connect back wall 54 with its front wall 56. The back wall 54 normally lies flat against a suitable support, here represented by the annular rim 26 of rotor 24. Integral arms 58 terminally hooked are stamped from the back wall and spaced and dimensioned to be received through the openings 46 in the supporting rim 26. The lower end of the back wall 54 is bent rearwardly at 60 and dimensioned to be received through the horizontal slot 44 in the supporting rim 26.

With the clip thus associated with the rim 26 or other similarly apertured support, it is securely but releasably fastened by means of a spring key 62 which is separately illustrated in FIG. 7 and which is pushed between the hooked ends of arms 58 and the rear surface 64 of the supporting rim 26. The lateral wings 66 folded rearwardly from the side margins of the spring key 62 abut the upper edges of the hooked arms 58 to provide a stop which defines the proper position of the key in clip retaining engagement between the hooked extremities of arms 58 and the supporting rim 26. The key is preferably slightly arcuate in vertical section and its lower margin 65 is coined so that when the key is inserted it will not dig into the aluminum of which the rim 26 is normally made.

The forward wall portion 56 of the clip has an aperture 68 with downwardly converging margins between which the ball detent 70 partially projects. The opening is preferably, but not necessarily, oval. The spacing between the rear wall 54 and the front wall 56 of the clip is so related to the diameter of the detent ball 70 that when the detent ball is in registry with the larger upper end portion 72 of the opening 68, the ball is not in pressure engagement with either wall of the clip. However, as the ball tends to move by gravity toward the smaller end 74 of the oval opening 68, it wedges between the front and rear walls of the clip to hold securely an order slip or ticket or other like work which is inserted between the detent ball 70 and the wall of the clip. The spacing between the front and rear walls is quite critical in relation to the diameter of the ball 70.

In order that the margins 76 of the front wall portion 56 of the clip may provide a smooth ball race, without burrs, the opening 68 is formed before the radius 52 is made and the blanking is done from that surface which lies at the inside of the finished wall 56 so that the surface that engage the ball is the smoothly rounded margin 76, separately illustrated in FIG. 8.

Some of the stock from the two sides of the front wall 56 is pressed rearwardly to provide a pair of arms 78 which extend inwardly and preferably in a plane passing below the diameter of ball 70, so that any inserted work piece such as the order slip 80 will be guided toward the rear of the ball 70 to lie between the ball and the rear wall 54 of the clip. Here the work piece will be securely wedged by the movement of the ball under gravity bias toward the smaller end portion 74 of the opening 68 in front wall 56. Any attempt to pull the work piece downwardly from engagement in the clip will simply increase the wedging action of the ball. However, if the work piece is moved laterally, and particularly if the lateral movement has a slight upward component, the wedging action of the ball is instantly released and the work piece moves freely from the clip.

Because of the downward convergence (or upward divergence) of the side margins of the opening 68, any lateral movement of the work will tend to move the ball upwardly rather than downwardly, thus releasing the work from clamping engagement of the detent ball.

It will be understood that details given herein are merely for the purpose of exemplifying the best known ways in which the invention may be practiced. They are not intended by way of limitation.

It has been found desirable to make the ball 70 of stainless steel of about 60 to 62 Rockwell. The clip, on the other hand, is desirably not made of stainless steel but of beryllium copper spring stock known commercially as "Berylco 25." It is hardened to about 38 or 40 Rockwell C and in practice has been nickel plated. We have successfully used .020 stock for the clip. Springiness of the stock permits ready insertion of ball 70 between the front and rear walls of the completed clip. The degree of springiness should be such that the insertion or removal of the ball will not destroy the critical spacing between its front and rear walls by exceeding permissible tolerance.

The length of the hooked fingers 58 is determined by the width of the strip from which the clip is blanked, the fingers being cut from stock which is initially no wider than the lower portion of the back wall 54. The same is true of the guide arms 78, the combined width of the guide arms and the front wall 56 being the width of the strip from which the clip was blanked.

While it is not necessary that the opening 68 be oval, nor that it be blanked out before the clip is bent on radius 52 to provide the front and rear walls, nevertheless this procedure is a desirable one and if the opening is blanked from the rear as above suggested, the ball 70 is not exposed to burrs but is provided with a smoothly rounded ball race 76.

We claim:

1. A support for order slips and like work, which support comprises a mounting post having a mounting flange, a wheel having a hub rotatably carried by the mounting post and including a rim, and a plurality of clips peripherally spaced upon the rim, each such clip comprising front and rear walls, the front wall having an aperture of downwardly tapering width, and a detent ball confined between said walls and extending into the aperture, the space between said walls being open downwardly whereby to receive work inserted between the ball and the rear wall to be held by the ball in clamping engagement with the rear wall.

2. A support according to claim 1 in which the wheel comprises spokes integrally formed to provide hub segments from the ends of which individual spokes extend to the rim, said segments being connected together about the post to constitute said hub.

3. A support according to claim 2 in which the post has axially spaced means engaged with the hub to position the wheel upon the post, said means including a removable collar and the post having a flange at one end adapted for the support of the post from a surface in any orientation, the wheel being invertible with respect to the post upon removal of the collar, whereby to position respective clips properly in any post orientation to receive the work to be retained therein.

4. A support according to claim 2 in which the post has means for axially positioning the hub of said wheel, at least one such means being removable to permit the wheel to be withdrawn from the post, at least one of the spokes having an aperture in which the post may be retained by replacement of said one means to locate the post for shipment in the plane of the wheel.

5. A support according to claim 1 in which each work supporting clip comprises a single strip of spring sheet metal having said front and rear walls and an upper portion connecting said walls, the rear wall having integral mounting arms and the front wall having an aperture with downwardly converging margins and through which projects a portion of the detent ball confined between said walls.

6. A support according to claim 5 in which the mounting means integral with the rear wall of the clip extend through apertures with which the rim of the wheel is provided and have hooked ends behind the rim, together with a key engaged between the hooked ends of said arm and the rear surface of the rim for retaining the clip in position on the front of the rim.

7. As a new article of manufacture, a clip for retaining an order slip or like work, the clip comprising front and rear walls and an upper portion connecting said walls, the front wall having an opening defined by downwardly converging margins, a ball confined between said walls and projecting through said opening, the ball being free when in registry with the upper part of the opening and being peripherally wedged toward the rear wall when moved toward the lower end of the opening, the lower portion of the clip being open to receive work interposed between the ball and the rear wall of the clip, the insertion of the work tending to raise the ball toward that portion of the opening in which it is free and the weight of the work being exerted on the ball in a direction to move it toward the lower part of the opening, wherein the ball is wedged toward the rear wall of the clip in confining engagement with the interposed work, the work being freely withdrawable in a direction which does not move the ball toward the lower edge of the opening.

8. A clip according to claim 7 in which the upper portion of the clip has a radius and the rear wall of the clip is integrally provided with arms projecting rearwardly from its side margins and having hooked extremities.

9. A clip according to claim 8 in further combination with a mounting member having a surface with which the rear wall of the clip is in face contact, the mounting member having openings through which the arms project, the thickness of the mounting member being less than the length of said arms, and a key interposed between the mounting member and the said hooked extremities of said arms whereby to secure the clip to the mounting member.

10. A clip according to claim 7 in which the front wall of the clip is provided at its respective sides with integral guide members upwardly and rearwardly extending from the lower end of the front wall and extending toward and terminating in spaced relation to the rear wall of the clip.

References Cited by the Examiner

UNITED STATES PATENTS

| | | | |
|---|---|---|---|
| 613,538 | 11/1898 | Varney | 40—68 |
| 784,070 | 3/1905 | Rhoads | 211—124 |
| 889,517 | 6/1908 | Gerken | 240—2 |
| 1,414,902 | 5/1922 | Smith | 211—163 |
| 1,479,243 | 1/1924 | Kamrath | 24—244 |
| 2,595,837 | 5/1952 | Freeman | 211—10 |

FOREIGN PATENTS 58,381  3/1913  Germany.

CLAUDE A. LE ROY, *Primary Examiner.*

K. J. WINGERT, *Assistant Examiner.*